W. R. MEARS.
Spading-Machine.
No. 49,642. Patented Aug. 29, 1865.
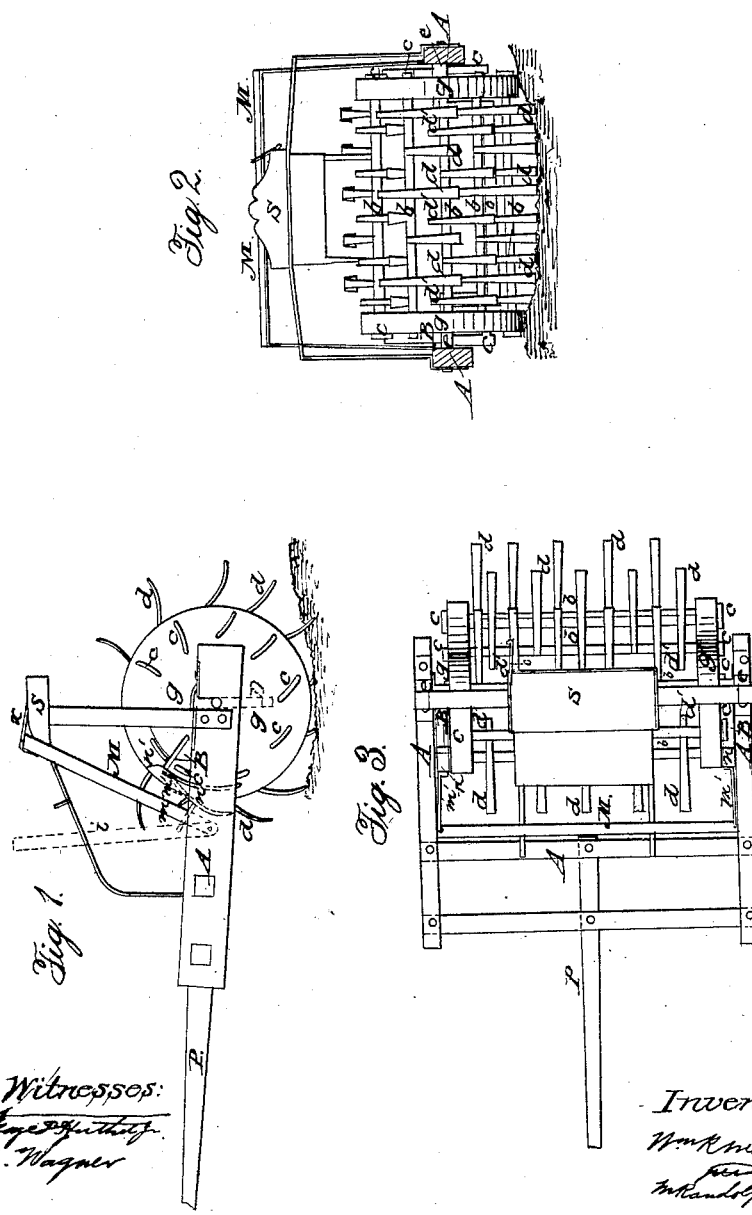

UNITED STATES PATENT OFFICE.

WM. R. MEARS, OF GRAFTON, ILLINOIS.

IMPROVEMENT IN SPADING-MACHINES.

Specification forming part of Letters Patent No. 49,642, dated August 29, 1865.

*To all whom it may concern:*

Be it known that I, WILLIAM R. MEARS, of the city of Grafton, in the county of Jersey and State of Illinois, have invented a new and useful Improvement in Rotary Spading Machines; and I do hereby declare that the following is a full, clear, and exact description thereof, reference being had to the accompanying drawings, and to the letters of reference marked thereon.

Figure 1 of the annexed drawings is a side elevation of one of the improved spading-machines. Fig. 2 is a rear end elevation of the same. Fig. 3 is a top plan, showing the details of the same.

To enable others skilled in the art to make and use my invention, I will proceed to describe its construction and operation.

I construct a frame, A, which forms the bearings for the bent shaft D, which passes through the wheels $g$, between which are located the rock-shafts or rollers $b$, to which the spades $d$ are attached. The shaft or axle D is bent downward for that part of its length which is between the wheels $g$, for the purposes hereinafter mentioned. The rollers $b$ pass through circular holes made in the wheels $g$ at regular intervals, and are provided with segmental levers $c$, to which they are firmly attached on the outsides of the wheels $g$. There should be two convex plates or cams, B, fastened to the frame A in such a position that their convex surfaces will fall in a circle described by a radius which has one of its ends terminating at the center of the bearing $e$ of the axle D, and whose length is equal to the distance of one of the segmental levers from the same point, which distance should be taken when the concave side of the lever $c$ is toward the bearing $e$ and its ends equidistant from it. The bent lever M is connected with the frame A by means of bolts, and is operated by the driver. Near its lower end, at $m$, is the connecting-rod $m'$, which connects it with the concave-surface plate $n$, which is pivoted to its fulcrum at $n'$. Some of the shanks $d'$ of the spades $d$ are long enough to reach up against the axle D while the spades are in the ground, and so long that they will rest against the axle until that portion of the wheels to which they are attached has risen sufficiently above the ground in the onward progress of the machine to throw the spades out of the ground. By this arrangement of the spades they are certain to thoroughly disintegrate the soil. So soon as the wheel has revolved a sufficient distance for the shanks $d'$ of the spades to pass the axle the spades will assume a vertical position by the action of their own weight.

The frame A is provided with a pole, P, to which the motive power is attached, and is surmounted by a seat, $s$, on which the driver rides.

When the machine is to be set to work the lever M is to be pulled up by the driver into the position it is shown to occupy in Fig. 1, and it will be retained in that position by the hook $x$ being thrown over it. When the lever M is brought up into the above-described position it will cause the plate $n$ to assume a distance from the cam B just sufficient to allow the segmental levers $c$ to pass between them. As the wheels $g$ revolve each of the segmental levers $c$ in succession will strike the convex plate or cam B and cause the rollers $b$, with their spades, to turn over into the position they should occupy to readily enter the ground as the wheels revolve. As soon as the levers $c$ strike the cam B and are turned over, so that their concave surfaces come in contact with the convex surface of said cam B, to which they closely fit, their outer or convex surface will be caused to pass close to the concave surface of the plate $n$, which will cause the spade-shafts $b$ to be held firmly in the position they should occupy to enable the spades to enter the ground. As soon as the spades have entered the ground to their maximum depth the levers $c$ will have passed the cam B and guide-plate $n$, and consequently the rollers or spade-shafts $b$ will be free to turn as occasion may require. At this point of the operation the shanks $d'$ of the spades will strike against the axle D, which is bent down between the wheels $g$ for that purpose, and will cause the spades, with the soil upon them, to rise up out of the ground abruptly, precisely similar to the manner in which the same operation would be performed were the operation of spading the soil performed by manual labor. When the spades have thrown the soil upon them out of the way the shanks $d'$ will have passed the axle D, and the spades will then assume a vertical position by the action of their own weight while passing up on the back side of the wheels $g$, and they will remain in the same relative position to the wheel until they are again thrown over by the action of the levers $c$ against the cam B.

When it is desired to move the machine without the spades taking effect in the ground, all that is necessary to be done is to unhook the hook $x$ from the lever M and throw the lever forward into the position shown by the dotted lines $i$ in Fig. 1. The levers $c$ will then be free to turn as soon as they have passed the cam B, and the spades will drop back without entering the ground.

Having thus fully described my invention, what I claim therein as new, and desire to secure by Letters Patent, is—

1. The combination of a series of pivoted spade shafts or rollers, $b$, and attached spades $d$ with a pair of supporting-wheels, $g\ g$, when the journals of said rollers $b\ b$ are confined in fixed and stationary bearings formed in said wheels, substantially in the manner and for the purpose hereinafter set forth.

2. In combination with the spade-shafts or rollers $b$, rocking in stationary bearings, as described, the outer segmented levers, $c\ c$, cam B, and guide-plate $n$, all arranged and operating substantially in the manner and for the purpose herein set forth.

3. The combination of a series of spades, $d\ d$, with a bent axle, D, and supporting-wheels $g\ g$, substantially in the manner and for the purpose herein described.

W. R. MEARS.

Witnesses:
GEORGE P. HERTHEL, Jr.,
A. WAGNER.